(12) United States Patent
Castle

(10) Patent No.: US 12,413,383 B1
(45) Date of Patent: Sep. 9, 2025

(54) LOW-POWER MULTI-VARIABLE FEEDBACK CONTROL LOOP

(71) Applicant: Synopsys, Inc., Mountain View, CA (US)

(72) Inventor: David Edgar Castle, Riverside, CA (US)

(73) Assignee: Synopsys, Inc., Mountain View, CA (US)

( * ) Notice: Subject to any disclaimer, the term of this patent is extended or adjusted under 35 U.S.C. 154(b) by 113 days.

(21) Appl. No.: 18/072,590

(22) Filed: Nov. 30, 2022

(51) Int. Cl.
*H04L 7/033* (2006.01)
*H04L 1/00* (2006.01)

(52) U.S. Cl.
CPC ............ *H04L 7/033* (2013.01); *H04L 1/0083* (2013.01); *H04L 7/0331* (2013.01)

(58) Field of Classification Search
CPC ........... H04B 1/38; H04B 1/40; H04L 1/0079; H04L 1/0083; H04L 7/00; H04L 7/0016; H04L 7/0274; H04L 7/033; H04L 7/00331; H04L 7/0331; G05B 19/408; G05B 19/4083; G07C 2209/10
USPC ....... 375/219, 220, 254, 257, 259, 285, 327, 375/373, 376; 348/464–467, 496, 490, 348/495; 370/282, 300–302; 714/701
See application file for complete search history.

(56) References Cited

U.S. PATENT DOCUMENTS

| | | | | |
|---|---|---|---|---|
| 5,018,134 A | * | 5/1991 | Kokubo | H04B 3/232 370/290 |
| 6,175,911 B1 | * | 1/2001 | Oberman | G06F 7/535 712/221 |
| 2010/0254037 A1 | * | 10/2010 | Shinohara | G06F 3/061 360/39 |
| 2013/0027611 A1 | * | 1/2013 | Closset | H03L 7/087 348/E5.009 |
| 2016/0285587 A1 | * | 9/2016 | Noest | H04L 1/0036 |
| 2020/0226088 A1 | * | 7/2020 | Seger, Jr. | H04L 47/82 |

\* cited by examiner

*Primary Examiner* — Young T. Tse
(74) *Attorney, Agent, or Firm* — Lowenstein Sandler LLP

(57) ABSTRACT

A system includes a receiver that receives first data of a first data format at an input frequency. The system includes a transmitter that transmits second data of a second data format at a transmission frequency. The system includes a format converter, coupled between the receiver and the transmitter, that converts the first data to the second data. The format converter includes a phase-locked loop that provides an initial output frequency which is a product of a reference clock frequency and a first frequency multiplier. The format converter includes a feedback control loop that converts, using a one-bit floating-point converter, the initial output frequency of the phase-locked loop to a modified output frequency corresponding to the transmission frequency.

11 Claims, 8 Drawing Sheets

LOW-POWER MULTI-VARIABLE FEEDBACK CONTROL LOOP

TECHNICAL FIELD

The present disclosure relates to the field of integrated circuits (IC), and in particular to feedback control loops.

BACKGROUND

A circuit can be designed to generate an output signal. If the output signal depends on one or more other values (variables or parameters), when one of the variables changes, the output signal needs to change accordingly. To continuously update the output signal based on the one or more variables, a feedback loop can be created. The loop receives as an input the output signal, the signal is updated based on the one or more variables, and the new signal is the output of the loop. The new signal is then fed back into the loop as the input, and the process repeats.

SUMMARY

In one or more embodiments, a system includes a receiver to receive first data of a first data format at an input frequency. The system includes a transmitter to transmit second data of a second data format at a transmission frequency. The system includes a format converter, coupled between the receiver and the transmitter, to convert the first data to the second data. The format converter includes a phase-locked loop (PLL) that provides an output frequency based on a first frequency multiplier. The format converter includes a feedback control loop coupled to the PLL. The feedback control loop converts, using a one-bit floating-point converter, the output frequency of the PLL to the transmission frequency. The transmission frequency is based on a second frequency multiplier. The one-bit floating-point converter generates a one-bit floating-point number from an integer value of the first data to convert the first frequency multiplier into the second frequency multiplier.

In one or more embodiments, a processing device obtains a first output value for a device. The first output value corresponds to a first parameter of the device that has an associated first target parameter. The processing device obtains a first measurement of the first parameter of the device. The processing device calculates a first one-bit floating-point shift term based on the first measurement of the first parameter and the first target parameter. The processing device calculates a first adjustment value based on shifting the first output value according to the first one-bit floating-point shift term. The processing device generates a second output value for the device by combining the first output value and the first adjustment value. The second output value may be based on minimizing an error of the first target parameter of the device.

In one or more embodiments, a device includes a first one-bit floating-point converter configured to receive a first error value. The device includes a second one-bit floating-point converter configured to receive a first target value. The device includes a first one-bit floating-point divider coupled to the first one-bit floating-point converter and the second one-bit floating-point converter. The device includes a first one-bit floating-point multiplier configured to receive an input value and coupled to the first one-bit floating-point divider. The device includes a first adder-subtractor configured to receive the input value and a first error sign value. The first adder-subtractor is coupled to the first one-bit floating-point multiplier. The first adder-subtractor generates a first output value.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
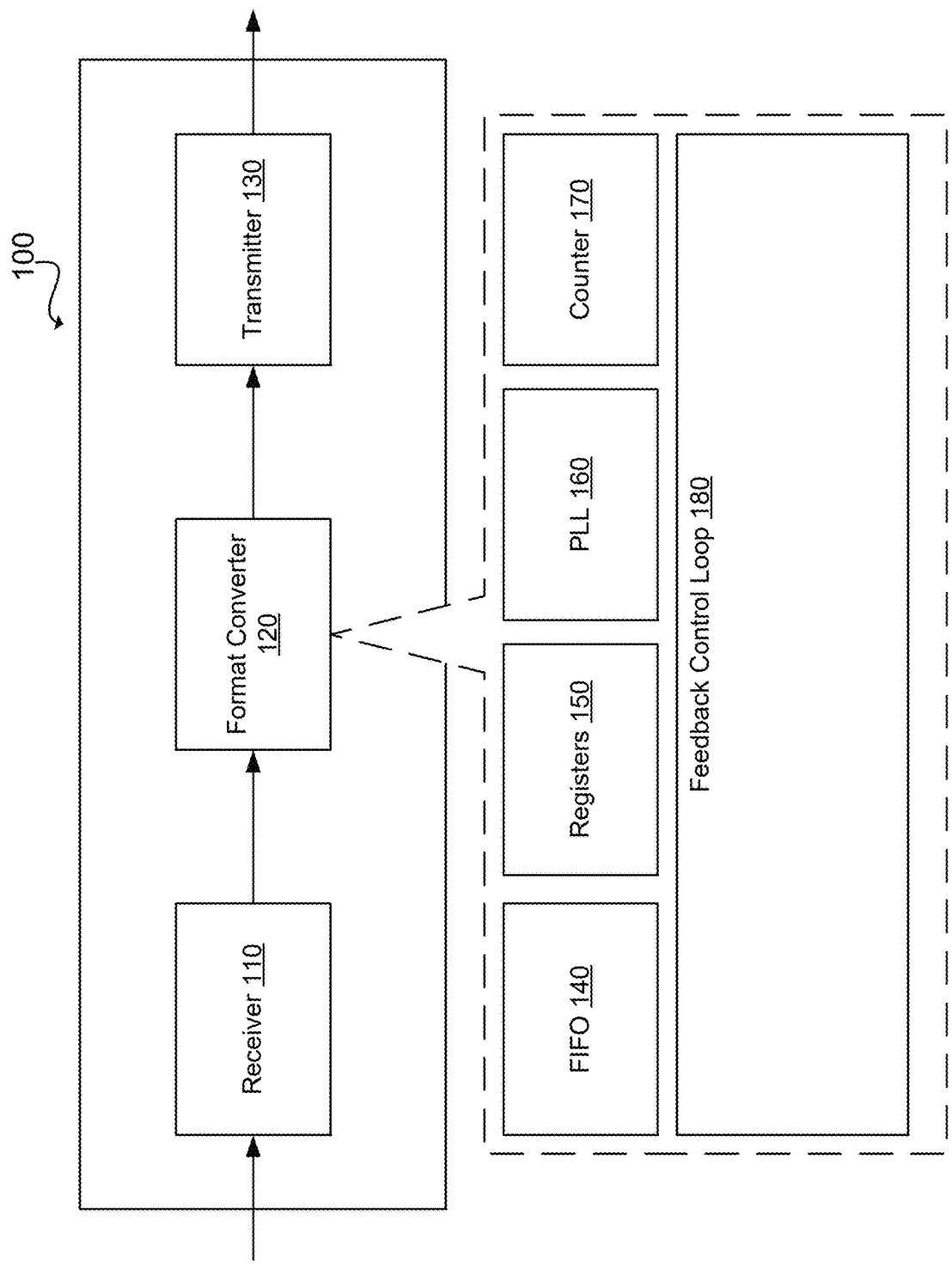
FIG. 1 illustrates an example system implementing a feedback control loop in accordance with some embodiments of the present disclosure.

Aspects of the present disclosure relate to low-power multi-variable feedback control loops. The output signal of a control loop may be based on the value of one or more variables that are measured by the system. For example, if the output signal is based on two variables, each variable may have an associated target value. The system may calculate a measurement for each variable. An error value may be calculated based on the difference between the measured variable value and the target variable value. The output signal may then be adjusted based on the error value. Some feedback control loops require an output signal with high-precision (e.g., a number with 6-17 significant decimal digits), thus requiring high-precision during the calculation of the difference between the measured variable and the target variable. The difference between the measured variable and the target variable may be determined using floating-point number operations (e.g., single-precision floating-point numbers, double-precision floating-point numbers). In some scenarios, when the calculations have limited dynamic range (e.g., do not require the dynamic range floating-point number operations provide), fixed-point number operations can be used. However, the circuitry required to implement either floating-point number operations or fixed-point number operations in hardware consumes a lot of power and requires a large area. Due to these limitations, hardware implementations of such operations may not be used in relatively smaller battery-powered mobile applications. Therefore, such operations are usually implemented in software on a processor of the device. However, this may require low-latency handling of interrupts and fast processing of the feedback operations that should be computed often to keep the system operating correctly. This often causes excessive processing burdens on a system microcontroller.

Aspects and embodiments of the present disclosure address these and other technological challenges by using low-power one-bit floating-point circuitry. In one embodiment, a device of the present disclosure may be used in a system configured to convert an input video stream into an output video stream (e.g., a mobile industry processor interface (MIPI) to high-definition multimedia interface (HDMI) converter). The system may have a receiver, a converter, and a transmitter. The converter may have a phase-locked loop (PLL) that generates a clock pulse and controls a transmission frequency of the transmitter. The PLL may be configured such that the output frequency of the PLL (the transmission frequency of the transmitter) is the product of an input reference clock frequency multiplied by a frequency multiplier. The frequency multiplier may be modified in a feedback control loop based on one or more variables (parameters) of the system, according to the present disclosure. By modifying the frequency multiplier, the feedback control loop may modify the output frequency of the PLL. In some embodiments, the converter has a first-in-first-out queue (FIFO) that the receiver puts data into. The transmitter may pull (pop) data out of the FIFO and transmit the data at the transmission frequency. If the transmission frequency is too high, the FIFO can underflow, as data is pulled out faster than it is pushed in. If the transmission frequency is too low, the FIFO can overflow, as data is pushed in faster than it is pulled out. One or more parameters of the system may be measured to determine whether the transmission frequency is too high or too low. For example, the system may measure the number of clock cycles (at the transmission frequency) that occur between a first synchronism control (e.g., a vertical sync (VSYNC) data packet) being pushed into the FIFO and a second synchronism control being pushed into the FIFO (e.g., a period of the FIFO). The system may also measure the number of clock cycles (at the transmission frequency) that occur between a synchronism control (e.g., a predetermined synchronism control) being input into the FIFO and the same synchronism control being output from the FIFO (e.g., a latency of the FIFO). Each measured parameter (e.g., the period of the FIFO and the latency of the FIFO) may have an associated target parameter. The target parameter may be a value that provides the most optimal performance of the system. By modifying the transmission frequency, the value of each measured parameter may change and the error between the measured parameter and the associated target parameter may change. The feedback control loop may be configured to modify the frequency multiplier of the PLL (and thus the transmission frequency of the transmitter) to minimize an error between each of the measured parameters and their associated target parameters.

The feedback control loop can be used to generate an output value (e.g., the new frequency multiplier) based on the previous output value and minimizing the error between one or more parameters of the system and associated target parameters. The feedback control loop as disclosed herein may use low-power one-bit floating-point circuits to perform the necessary calculations. Binary integer values (e.g., unsigned binary numbers) may be converted to one-bit floating-point numbers using a one-bit floating-point converter. In some embodiments, the one-bit floating-point converter is a priority encoder which converts an integer to a one-bit floating-point number. For example, the one-bit floating-point converter receives the binary integer value as an input and outputs a normalized one-bit floating-point number that approximates the binary integer input. The one-bit floating-point number may contain a sign bit, one or more exponent bits, and a one-bit mantissa. The mantissa represents the actual binary digits of the floating-point number while the exponent bits represents the power of two. Because the one-bit floating-point number is normalized, the one-bit mantissa should be understood to be one and does not need to be stored or represented in the output value of the one-bit floating-point converter. (The one-bit floating-point number may be longer than one bit; it is called a one-bit floating-point number because the mantissa stays (e.g., is always) one bit long.) The exponent bits of the one-bit floating-point number may be based on the most-significant-bit of the binary integer input value that is set to one. Using the one-bit floating-point converter, a multi-bit binary integer with many bits (e.g., 24 bits) may be converted to a one-bit floating-point number with much fewer bits (e.g., 6 bits). Because the one-bit floating-point numbers can represent (an approximation of) the binary integer with less bits, the disclosed circuits require relatively less area. Although converting a binary integer value to an approximate one-bit floating-point number may introduce an error as large as 50%, the feedback control loop can quickly stabilize after a few iterations, thus eliminating any errors.

By using such one-bit floating-point numbers, otherwise high power consuming mathematical calculations can be performed by low-power circuits. A one-bit floating-point divider can divide two one-bit floating-point numbers using a subtractor. A one-bit floating-point multiplier can multiply a value by a one-bit floating-point number using a programmable logic shifter. The one-bit floating-point multiplier may contain a programmable logic shift register. By combining one-bit floating-point dividers and one-bit floating-point multipliers, the feedback control loop may update the output value based on one or more variables.

The technical advantages of the present disclosure include, but are not limited to, systems and methods that modifies the output signal of a feedback control loop based on the values of one or more variables using relatively less power and less area. By using one-bit floating-point circuitry, the present system and method can quickly stabilize the feedback control loop by calculating updates to the output signal based on changes to the one or more measured variables.

FIG. 1 illustrates an example system 100 implementing a feedback control loop 180 in accordance with some embodiments of the present disclosure. In some embodiments, system 100 includes a receiver 110, a format converter 120, and a transmitter 130. Receiver 110 may receive an input stream of data (e.g., video data). Format converter 120 may convert the input data into a different format and then transmit the converted data in the new format via transmitter 130. For example, receiver 110 receives an input stream of data in a MIPI format. Format converter 120 may convert the MIPI formatted data into HDMI formatted data. Then transmitter 130 may transmit the HDMI formatted data. In some embodiments, receiver 110 receives a continuous stream of data at a receiving frequency. The stream of data may include synchronism controls (e.g., a start of frame indicator) and active data packets (e.g., video pixels), and non-data blanking periods. Some or all of the data may be added to a clock domain crossing first-in-first-out queue (FIFO) 140 of format converter 120. Transmitter 130 may remove data from FIFO 140 and transmit the data at a transmission frequency. Format converter 120 may include a phase-locked loop (PLL) 160 that controls the transmission frequency of transmitter 130. PLL 160 may be configured such that the output frequency of the PLL (the transmission frequency of transmitter 130) is the product of an input reference clock frequency multiplied by a frequency multiplier. If the frequency multiplier (and, as a result, the transmission frequency) is too low, FIFO 140 will overflow because data is being added to FIFO 140 by receiver 110 faster than it is being removed by transmitter 130. If the frequency multiplier is too high, FIFO 140 will underflow because data is being removed by transmitter 130 faster than it is being added by receiver 110.

One or more parameters (e.g., period, latency, frequency, voltage, temperature, etc.) of system 100 may be measured to determine whether the transmission frequency is too high or too low. Format converter 120 may include a counter 170 that can measure one or more parameters of system 100. In some embodiments, counter 170 is reset when a first synchronism control is pushed into FIFO 140 by receiver 110. Counter 170 may increment at the output frequency of PLL 160. When a second synchronism control is pushed into FIFO 140 by receiver 110, the value of counter 170 may be stored in registers 150 of the format converter 120. This value may be a period of FIFO 140. In some embodiments, counter 170 is reset when a synchronism control is input into FIFO 140 by receiver 110 and may increment at the output frequency of PLL 160. When the synchronism control is output out of FIFO 140, the value of counter 170 may be stored in registers 150 of the format converter 120. This value may be a latency of FIFO 140. Registers 150 may also store a target parameter for each of the measured parameters of system 100. For example, a value of a target parameter may be stored in a target register of registers 150.

In some embodiments, measurements of system 100 are based on a counter, an analog device, and/or a mechanical device. For example, a measurement may be based on a difference between the current value of the free-running counter and a past value of the counter. In some embodiments, measurements of parameters of system 100 are based on an analog device. For example, a measurement may be based on the current accumulated voltage of a capacitor. In some embodiments, measurements of parameters of system 100 are based on a mechanical device. For example, a measurement may be based on the position of a wiper arm of a potentiometer or may be based movement of a ferrite bar in a coil of wire. Each measurement may be stored in a measurement register of system 100.

Format converter 120 may further include a feedback control loop 180 that modifies the frequency multiplier of PLL 160 in order to minimize an error between the measured parameters (e.g., period of the FIFO 140, latency of the FIFO 140) and their associated target parameters. By comparing the measured period ($P_m$) to a target period value ($P_t$), a period error ($E_p$) can be calculated according to the following equation:

$$E_p = \frac{P_m - P_t}{P_t} \quad (1)$$

By comparing the measured latency ($L_m$) to a target latency value ($L_t$), a latency error ($E_l$) can be calculated according to the following equation:

$$E_l = \frac{L_m - L_t}{P_t} \quad (2)$$

The frequency multiplier (N) can then be updated to minimize the period error and the latency error according to the following equation:

$$N_{new} = N_{current} + N_{current} \times E_p - N_{current} \times E_l \quad (3)$$

After modifying the frequency multiplier, counter 170 may make a second measurement of the same parameters of the system (e.g., period of FIFO, latency of FIFO) and store the new values in registers 150. The new values will be used to calculate period error $E_p$ and latency error $E_l$. When period error $E_p$ and latency error $E_l$ are zero, $N_{new} = N_{current}$ and the feedback control loop is stabilized.

Figure 3:
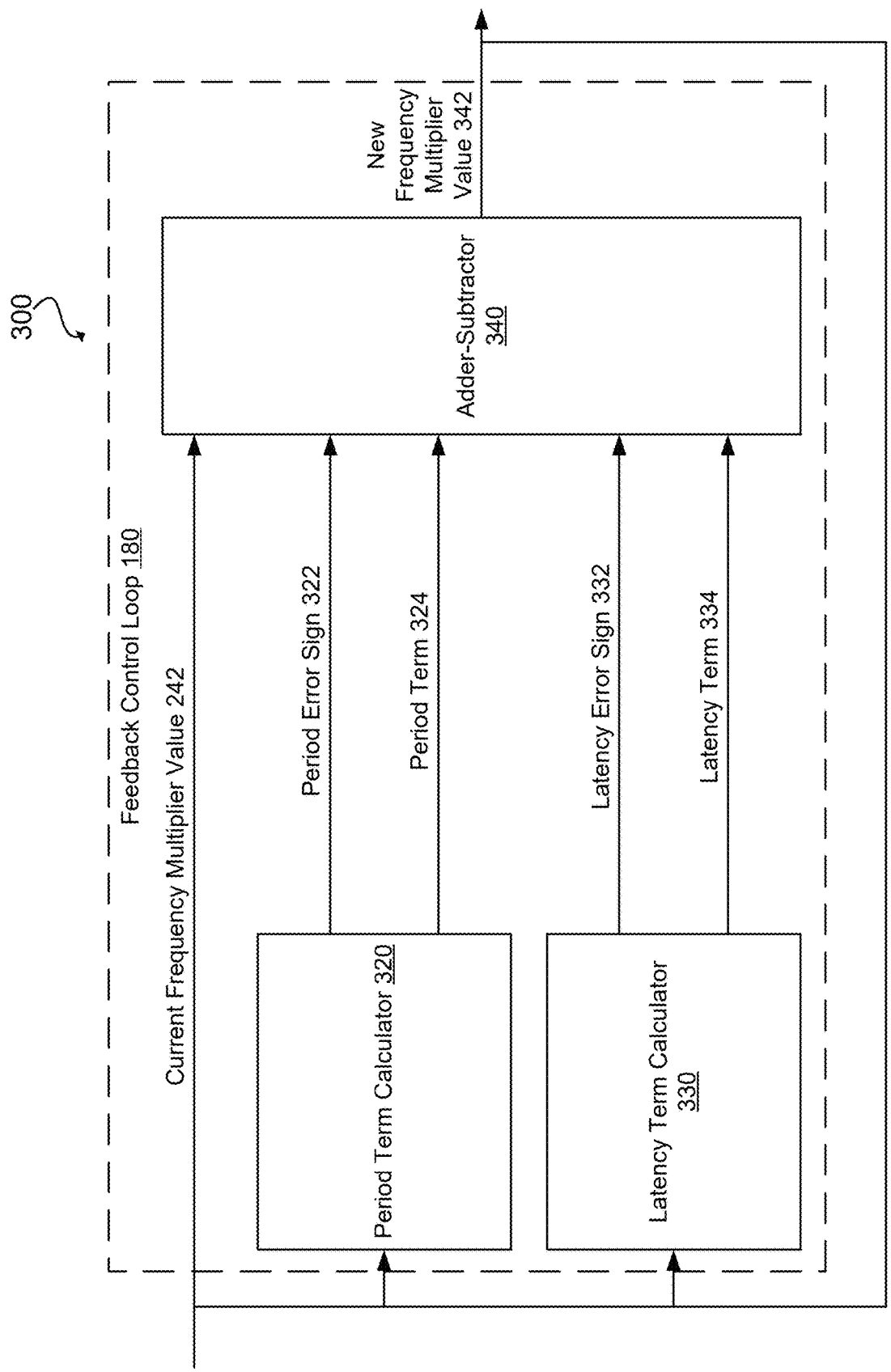
FIG. 3 illustrates a block diagram of an example feedback control loop in accordance with some embodiments of the present disclosure.
Figure 4:
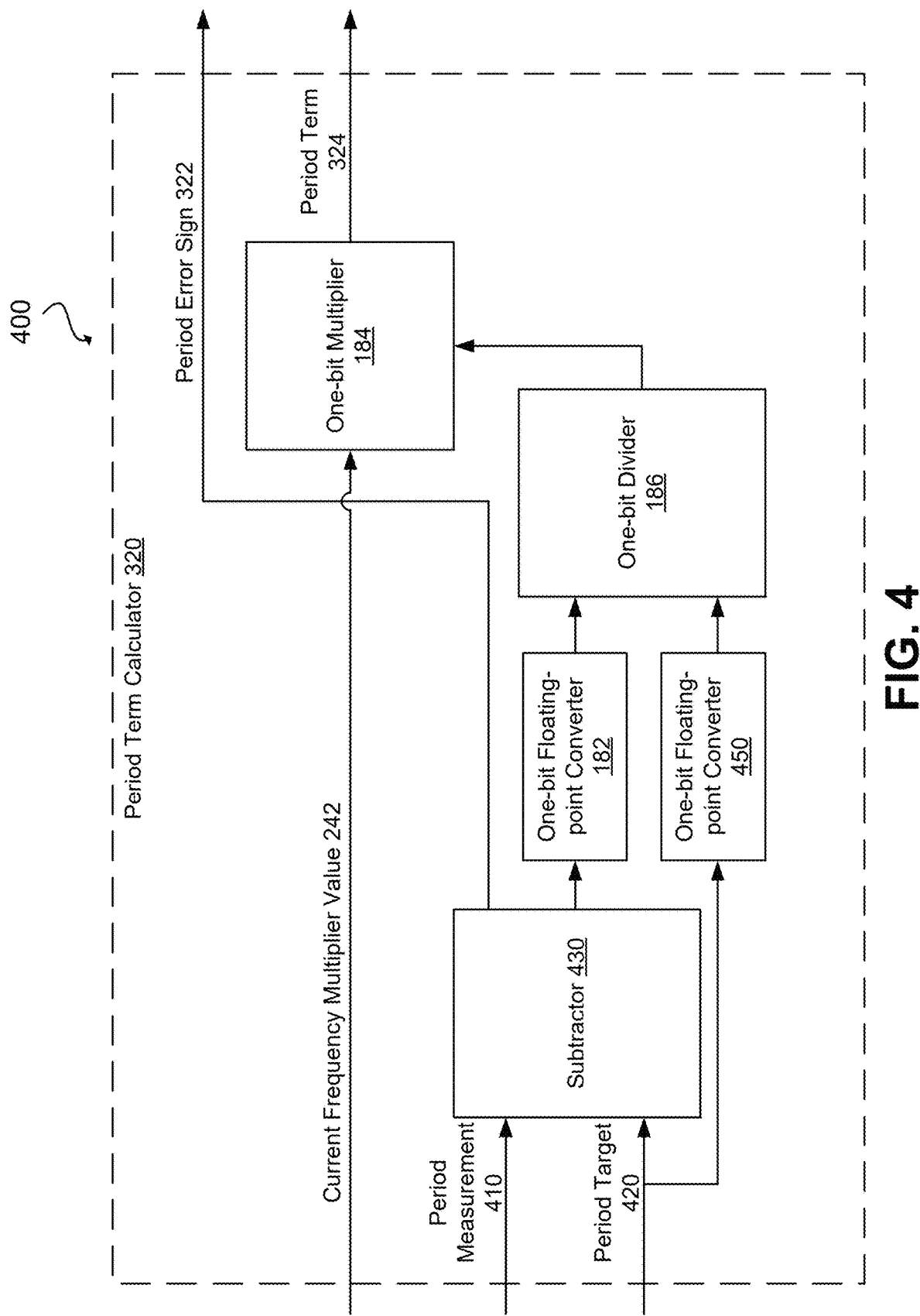
FIG. 4 illustrates a block diagram of an example period term calculator of a feedback control loop calculating a period term using one-bit floating-point circuits in accordance with some embodiments of the present disclosure.
Figure 5:
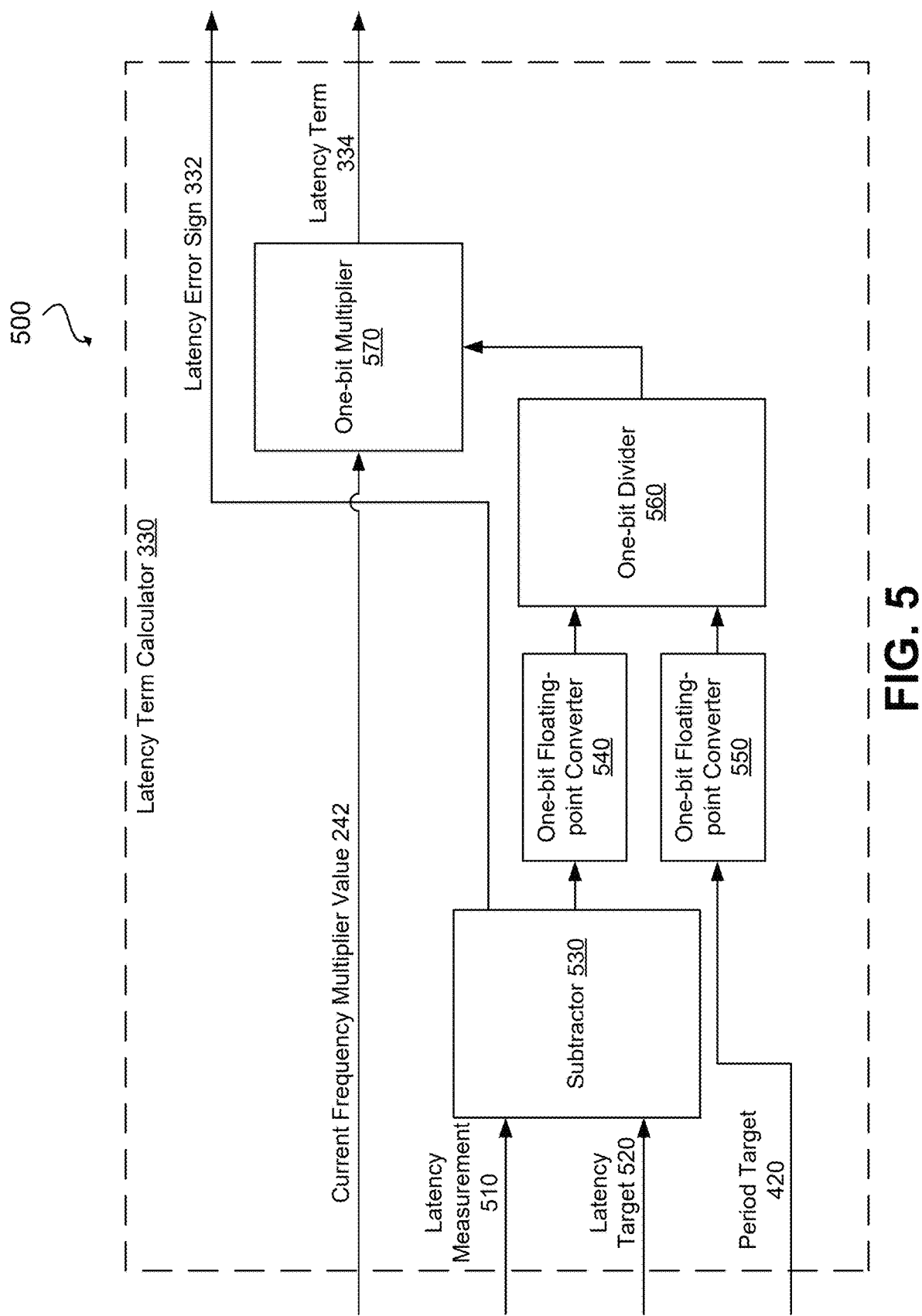
FIG. 5 illustrates a block diagram of an example latency term calculator of a feedback control loop calculating a latency term using one-bit floating-point circuits in accordance with some embodiments of the present disclosure.

The frequency multiplier may be efficiently determined using one-bit floating-point circuitry of the present disclosure, such as one-bit floating-point converter, one-bit multiplier, and one-bit divider. FIGS. 3-5 discuss how these circuits are used to modify the frequency multiplier of PLL 160 based on the calculated period error and latency error.

Figure 2:
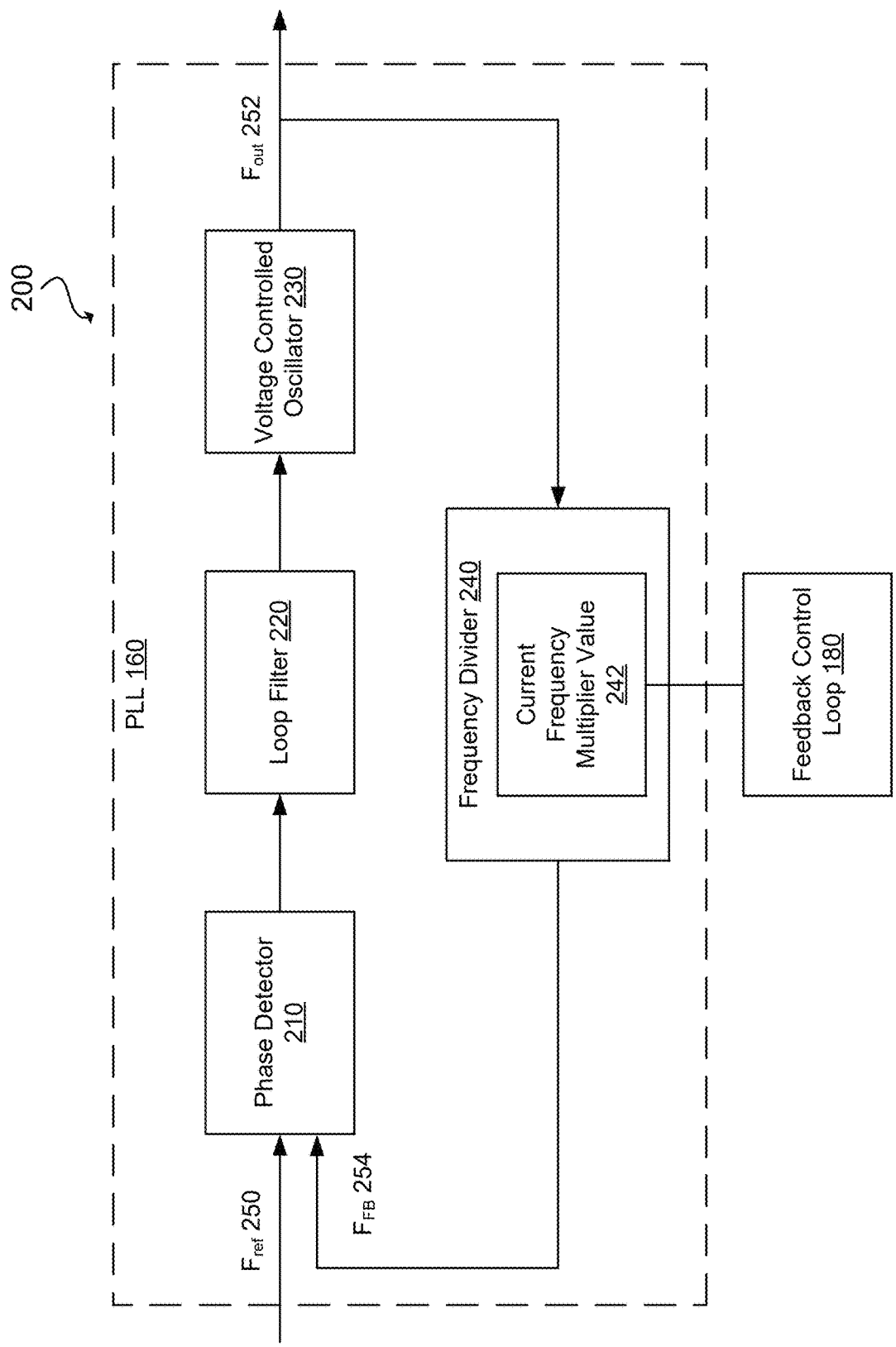
FIG. 2 illustrates a block diagram of an example phase-locked loop modified by a feedback control loop in accordance with some embodiments of the present disclosure.

FIG. 2 illustrates an example block diagram 200 of a phase-locked loop (PLL) 160 modified by a feedback control loop 180 in accordance with some embodiments of the present disclosure. In some embodiments, PLL 160 includes a phase detector 210, a loop filter 220, a voltage controlled oscillator (VCO) 230, and a frequency divider 240. PLL 160 may receive as inputs at phase detector 210 a reference clock frequency ($F_{ref}$) 250 and a feedback frequency ($F_{FB}$) 254. Phase detector 210 may generate a signal encoding a difference between $F_{ref}$ 250 and $F_{FB}$ 254. Loop filter 220 may then filter the signal produced by phase detector 210. The output of loop filter 220 may determine the output frequency ($F_{out}$) 252 of VCO 230. If $F_{ref}$ 250 is larger than $F_{FB}$, phase detector 210 and loop filter 220 will produce a signal that causes VCO 230 to increase the frequency of $F_{out}$ 252. If $F_{ref}$ 250 is smaller than $F_{FB}$ 254, phase detector 210 and loop filter 220 will produce a signal that causes VCO 230 to decrease the frequency of $F_{out}$ 252. $F_{out}$ 252 may be provided to another system component (e.g., transmitter 130 of FIG. 1). $F_{out}$ 252 may also be provided to frequency divider 240. Frequency divider 240 may divide $F_{out}$ 252 by current frequency multiplier value 242 to generate $F_{FB}$ 254 which is provided as an input into phase detector 210, creating a loop. Using frequency divider 240, $F_{out}$ 252 of PLL 160 can be described using the following equation:

$$F_{out} = F_{ref} \times \text{Current Frequency Multiplier} \quad (4)$$

Thus, by modifying current frequency multiplier value 242, the output frequency ($F_{out}$ 252) of PLL 160 can be modified. Feedback control loop 180 may modify current frequency multiplier value 242 according to measured parameters of the system as discussed above in FIG. 1 and below in FIGS. 3-5.

FIG. 3 illustrates a block diagram 300 of an example feedback control loop 180 in accordance with some embodiments of the present disclosure. In some embodiments, feedback control loop 180 includes period term calculator 320, latency term calculator 330, and adder-subtractor 340. Period term calculator 320 may be configured to generate period error sign 322 and period term 324, as discussed below in FIG. 4. Latency term calculator 330 may be configured to generate latency error sign 332 and latency term 334, as discussed below in FIG. 5. Adder-subtractor 340 may be a circuit capable of performing both adding numbers and subtracting numbers. Adder-subtractor 340 may perform addition or subtraction based on a control input value (e.g., period error sign, latency error sign). Adder-subtractor 340 may receive as inputs current frequency multiplier value 242, period error sign 322, period term 324 (a first adjustment value), latency error sign 332, and latency term 334 (a second adjustment value). Adder-subtractor 340 may add period term 324 to current frequency multiplier value 242 when period error sign 322 is positive and may subtract period term 324 from current frequency multiplier value 242 when period error sign 322 is negative (e.g., $N_{new}=N_{current}+N_{current} \times E_p$ of equation (3)). Adder-subtractor 340 may then add latency term 334 to current frequency multiplier value 242 when latency error sign 332 is positive and may subtract latency term 334 from current frequency multiplier value 242 when latency error sign 332 is negative. In some embodiments, adder-subtractor 340 subtracts current frequency multiplier value 242 and period term 324 when period error sign 322 is positive and may add current frequency multiplier value 242 and period term 324 when period error sign 322 is negative. In some embodiments, adder-subtractor 340 subtracts current frequency multiplier value 242 and latency term 334 when latency error sign 332 is positive and may add current frequency multiplier value 242 and latency term 334 when latency error sign 332 is negative (e.g., $N_{new}=N_{current}-N_{current} \times E_l$ of equation (3)). Adder-subtractor 340 may then output new frequency multiplier value 342, which may be provided to frequency divider 240 to modify $F_{out}$ 252 of PLL 160. New frequency multiplier value 342 may also loop back around and become an input to feedback control loop 180, period term calculator 320, and latency term calculator 330 for a subsequent round of calculations.

In some embodiments, the output value of feedback control loop 180 only depends on one parameter of the system with its associated target parameter. In some embodiments, the output value of feedback control loop 180 depends on more than two parameters of the system with their associated target parameters. Feedback control loop 180 may include a term calculator component (e.g., period term calculator 320, latency term calculator 330) for each of the parameters that affect the output value of feedback control loop 180.

FIG. 4 illustrates a block diagram 400 of an example period term calculator 320 of a feedback control loop calculating a period term 324 using one-bit floating-point circuits in accordance with some embodiments of the present disclosure. Period term calculator 320 may include a subtractor 430. Subtractor 430 may be configured to receive a period measurement 410 and a period target 420 (e.g., from registers 150 of format converter 120 of FIG. 1). Subtractor 430 may calculate a difference (e.g., an error) between period measurement 410 and period target 420. The difference may correspond to $P_m-P_t$ of equation (1). Subtractor 430 may also calculate a period error sign 322. Period error sign 322 may be positive if period measurement 410 is greater than period target 420, otherwise period error sign 322 may be negative. In some embodiment, subtractor 430 is configured such that the smaller of period measurement 410 and period target 420 is subtracted from the other input, such that the output value of subtractor 430 stays (e.g., is always) positive, with period error sign 322 identifying whether period measurement 410 was larger or smaller than period target 420.

In some embodiments, period measurement 410 and period target 420 are both multi-bit binary integer values with many bits (e.g., 24 bits). The difference between period measurement 410 and period target 420 may also be a binary integer value with the same number of bits. The difference may be provided to a one-bit floating-point converter 182. One-bit floating-point converter 182 may convert the binary integer value to an approximate one-bit floating-point number. One-bit floating-point converter 182 may generate a normalized one-bit floating-point number with a sign bit, one or more exponent bits, and a one-bit mantissa. Because the one-bit floating-point number is normalized, the one-bit mantissa is understood and may not be represented in the output value of one-bit floating-point converter 182. One-bit floating-point converter 182 may be configured such that the exponent of the one-bit floating-point number output is equal to the position of the most-significant-bit that is set to one in the binary integer input. For example, if the binary integer input is $35_{10}=00110111_2$, the most-significant-bit that is set to one is in position 5, counting from right to left starting at position 0. One-bit floating-point converter 182 would output $0101_2$, where the first zero is the sign bit and $101_2=5_{10}$ are the exponent bits. The one-bit mantissa is understood and not included in the output. The one-bit floating-point number approximates the binary integer input value: $0101_2=1 \times 2^{101_2}=1 \times 2^5=32_{10}$. Thus, converting $35_{10}$ to a one-bit floating-point number converts the 8-bit input value to a 4-bit output with an error of about $$9\% \left( \frac{35-32}{35} \times 100 = 8.57\% \right).$$

The error may be as large as 50% depending on the input value provided to one-bit floating-point converter 182.

One-bit floating-point converter 450 may receive as an input period target 420 (a binary integer value). The input of one-bit floating-point converter 450 may correspond to $P_t$ of equation (1). One-bit floating-point converter 450 may convert period target 420 to a one-bit floating-point number output, as discussed above. One-bit divider 186 may receive as inputs the one-bit floating-point output of ne-bit floating-point converter 182 (a first one-bit floating-point operand) and the one-bit floating-point output of one-bit floating-point converter 450 (a second one-bit floating-point operand). To divide the two input values, one-bit floating-point divider 460 can subtract the exponent of one of the one-bit floating-point inputs from the exponent of the other one-bit floating-point inputs. The following provides an example of converting two integer values to one-bit floating-point numbers (e.g., using one-bit floating-point converters 440 and 450) and then dividing the two one-bit floating-point numbers (e.g., using one-bit divider 186) compared to the calculations performed without converting the integer values to approximate one-bit floating-point numbers.

| Exact calculations | One-bit floating-point calculations |
|---|---|
| $366_{10} = 000101101110_2$ (most significant bit in position 8) | $01000_2 = 1 \times 2^{1000_2} = 1 \times 2^8 = 256_{10}$ |
| $829276_{10} = 11001010011101011100_2$ (most significant bit in position 19) | $000010011_2 = 1 \times 2^{19} = 524288_{10}$ |

| Exact calculations | One-bit floating-point calculations |
|---|---|
| $\dfrac{366}{829276} = 0.0004413488$ | $\dfrac{1 \times 2^8}{1 \times 2^{19}} = 1 \times 2^{8-19} = 1 \times 2^{-11} = 0.00048828125$ |

$$\text{Error:}$$
$$\dfrac{0.0004413488 - 0.00048828125}{0.0004413488} \times 100 = -10\%$$

The output of one-bit divider 186 may be a one-bit floating-point number. Continuing the example from above, the output of one-bit divider 186 may be $11011_2$, where the first bit indicates the sign (negative), and the remaining bits represent the exponent value ($11_{10}=1011_2$). The output of one-bit divider 186 may correspond to $$\frac{P_m - P_t}{P_t} = E_p$$

of equation (1).

In the above example, the one-bit floating-point calculations result in an error of −10%, but by converting the binary integer inputs to (approximate) one-bit floating-point numbers, the circuitry area required for these calculations is greatly reduced. Depending on the input values, the error may be larger than 50%. However, as discussed above, because these calculations are performed repeatedly in the feedback control loop, the final error will become smaller and smaller as the feedback control loop stabilizes and minimizes the errors between the measured parameters of the system and the associated target parameters.

The output of one-bit divider 186 (period shift term) may then be provided to one-bit floating-point multiplier 470 as a one-bit floating-point multiplicand. One-bit multiplier 184 may also receive current frequency multiplier value 242 as an additional input. One-bit multiplier 184 may be configured as a programmable logic shifter driven by a one-bit floating-point multiplicand, such that current frequency multiplier value 242 is bit-shifted according to the sign and exponent of the one-bit floating-point shift term output from one-bit divider 186. In some embodiments, current frequency multiplier value 242 is a binary integer value. In some embodiments, current frequency multiplier value 242 is a fixed-point number with an integer portion and a fractional portion.

Continuing the example from above, if the output of one-bit divider 186 is a one-bit floating-point number with a negative sign and an exponent of $11_{10}$, one-bit multiplier 184 may perform an arithmetic right shift on current frequency multiplier value 242 by $11_{10}$ bits. If the sign of the one-bit floating-point shift term were positive, one-bit multiplier 184 may perform an arithmetic left shift by $11_{10}$ bits. Shifting current frequency multiplier value 242 based on the exponent a of a one-bit floating-point number is the equivalent of multiplying (or dividing) current frequency multiplier value 242 by $1 \times 2^a$. One-bit multiplier 184 may then output period term 324. The output of one-bit multiplier 184 may correspond to $N_{current} \times E_p$ of equation (3).

FIG. 5 illustrates a block diagram 500 of an example latency term calculator 330 of a feedback control loop calculating a latency term 334 using one-bit floating-point circuits in accordance with some embodiments of the present disclosure. Latency term calculator 330 may include a subtractor 530. Subtractor 530 may be configured to receive a latency measurement 510 and a latency target 520 (e.g., from registers 150 of format converter 120 of FIG. 1). Subtractor 530 may calculate a difference (e.g., an error) between latency measurement 510 and latency target 520. The difference may correspond to $L_m - L_t$ of equation (2). Subtractor 530 may also calculate a latency error sign 332. Latency error sign 332 may be positive if latency measurement 510 is greater than latency target 520, otherwise latency error sign 332 may be negative. In some embodiments, subtractor 530 is configured such that the smaller of latency measurement 510 and latency target 520 is subtracted from the other input, such that the output value of subtractor 530 stays (e.g., is always) positive, with latency error sign 332 identifying whether latency measurement 510 was larger or smaller than latency target 520.

In some embodiments, latency measurement 510 and latency target 520 are both multi-bit binary integer values. The difference may also be a binary integer value with the same number of bits. The difference may be provided to a one-bit floating-point converter 540. One-bit floating-point converter 540 may generate a normalized one-bit floating-point number with a sign bit, one or more exponent bits, and a one-bit mantissa (e.g., one-bit floating-point error), as described above.

One-bit floating-point converter 550 may receive as an input period target 420. The input of one-bit floating-point converter 550 may correspond to $P_t$ of equation (2). One-bit floating-point converter 550 may convert period target 420 to a one-bit floating-point number output (e.g., one-bit floating-point target parameter), as discussed above. In some embodiments, one-bit floating-point converter 550 receives as an input the target value associated with the parameter being measured (e.g., latency target 520). One-bit divider 560 may receive as inputs the one-bit floating-point outputs of both one-bit floating-point converter 540 and one-bit floating-point converter 550. One-bit divider 560 may subtract the exponent of the one-bit floating-point number from one-bit floating-point converter 550 from the exponent of the one-bit floating-point number from one-bit floating-point converter 540, as discussed above. The output of one-bit divider 560 may correspond to $$\frac{L_m - L_t}{P_t} = E_l$$

of equation (2).

The output of one-bit divider 186 (latency shift term) may then be provided to one-bit multiplier 570 as a one-bit floating-point multiplicand. One-bit multiplier 570 may also receive current frequency multiplier value 242 as an additional input. One-bit multiplier 570 may be configured as a programmable logic shifter, such that current frequency multiplier value 242 is shifted according to the sign and exponent of the one-bit floating-point shift term output from one-bit divider 560. One-bit multiplier 570 may then output latency term 334. The output of one-bit multiplier 570 may correspond to $N_{current} \times E_I$ of equation (3).

Figure 6A:
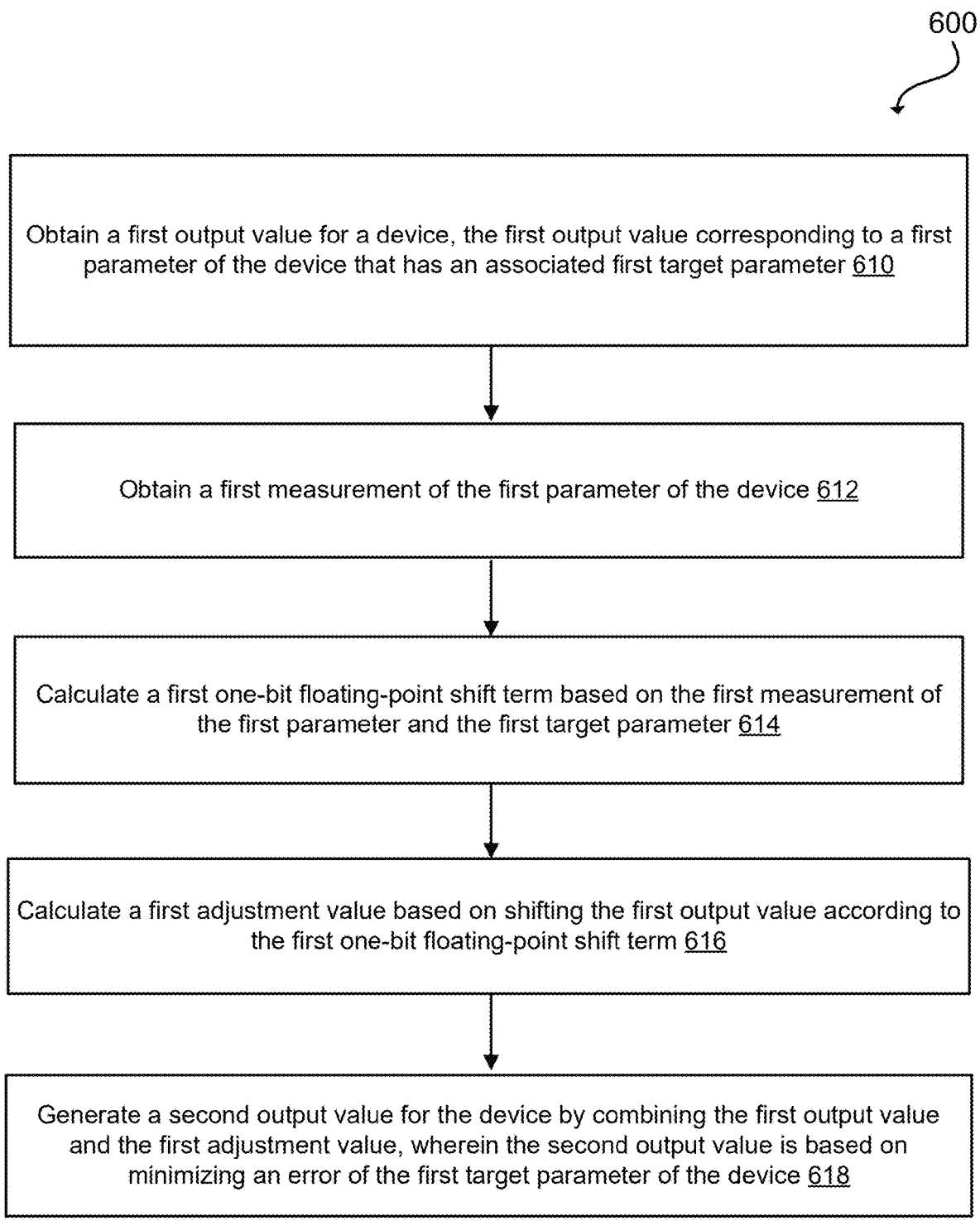
FIG. 6A depicts a flowchart of a method of modifying the output value of a feedback control loop in accordance with some embodiments of the present disclosure.
Figure 6B:
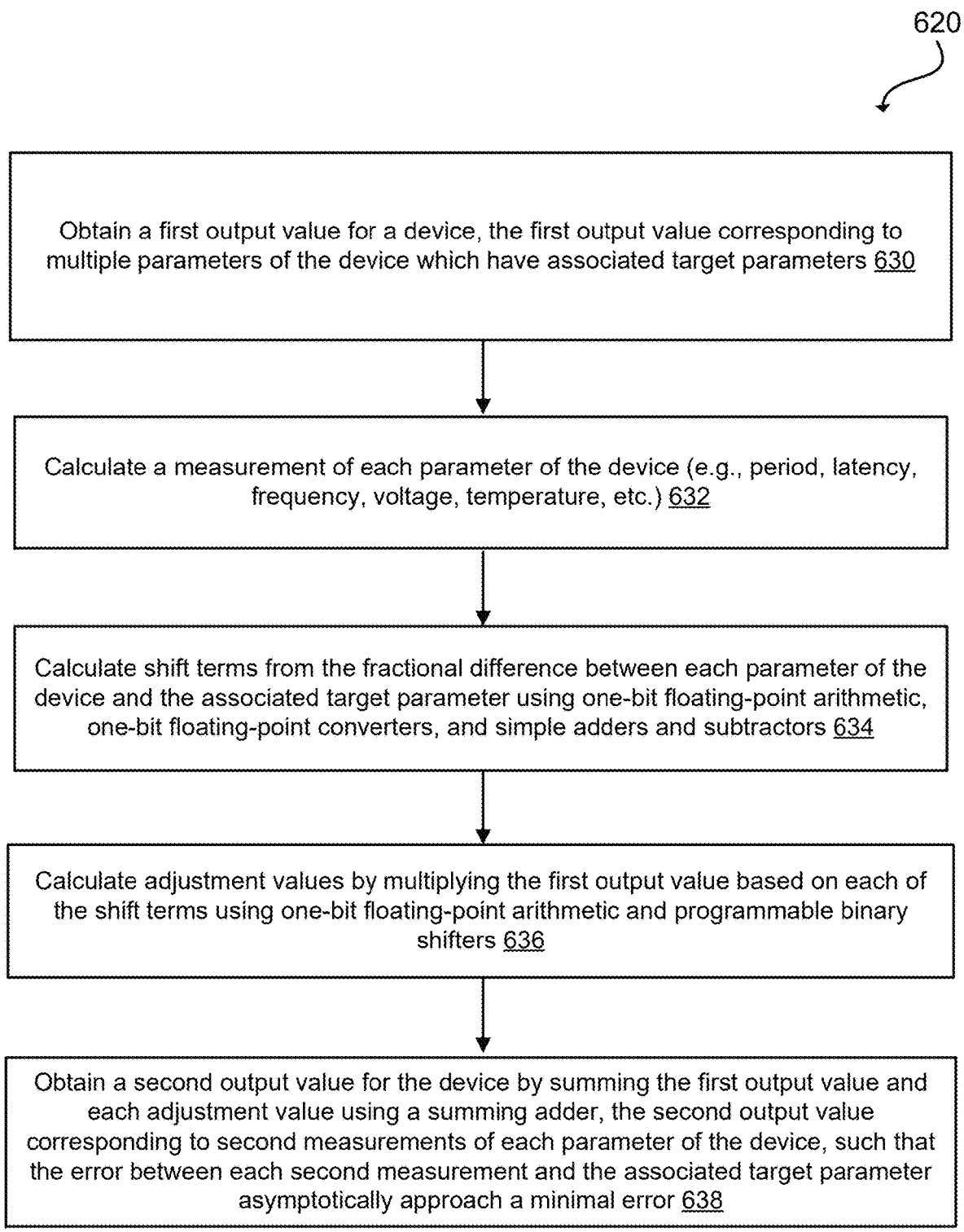
FIG. 6B depicts a flowchart of a method of modifying the output value of a feedback control loop in accordance with some embodiments of the present disclosure.

FIGS. 6A-6B depict flowcharts of methods 600 and 620 of modifying the output value of a feedback control loop in accordance with some embodiments of the present disclosure. Methods 600 and/or 620 can be performed by processing logic that can include hardware (circuitry, dedicated logic, etc.), software (e.g., instructions run on a processing device), or a combination thereof. In some embodiments, some or all of the operations of methods 600 and/or 620 can be performed by one or more components of system 100 of FIG. 1. In some embodiments, one or more of the operations of methods 600 and/or 620 may be omitted. In some embodiments, the order of one or more of the operations of methods 600 and/or 620 may be different than the order shown in FIGS. 6A-6B.

FIG. 6A depicts a flowchart of a method 600 of modifying the output value of a feedback control loop in accordance with some embodiments of the present disclosure. At 610, processing logic may obtain a first output value for a device, the first output value corresponding to a first parameter of the device that has an associated first target parameter. In some embodiments, the device is a video format converter with the first output value being a transmission frequency and the first parameter of the device being a period of a first-in-first-out queue. In some embodiments, the device is a portable wearable electronic (e.g., smart watch, smart glasses, etc.) with the first output value being a clock frequency and the first parameter of the device being a power limitation. In some embodiments, the device is a light-emitting diode (LED) controller with the first output value being an amount of power provided to the LED and the first parameter of the device being a temperature of the device. In some embodiments, the device is a ring oscillator with the first output value being a system clock frequency and the first parameter of the device being a voltage of the device.

It is to be understood that the device can include any device with a circuit that has to control something physical (e.g., a flow of electricity, a position of a motor, a clock frequency, a voltage or amperage of a circuit, etc.) based on one or more parameters of the device (e.g., temperature, power limitations, operating frequency, depth of a queue, processing load, etc.).

At 612, processing logic may obtain a first measurement of the first parameter of the device. At 614, processing logic may calculate a first one-bit floating-point shift term based on the first measurement of the first parameter and the first target parameter. At 616, processing logic may calculate a first adjustment value based on shifting the first output value according to the first one-bit floating-point shift term. At 618, processing logic may generate a second output value for the device by combining the first output value and the first adjustment value. The second output value may be based on minimizing an error of the first target parameter of the device.

FIG. 6B depicts a flowchart of a method 620 of modifying the output value of a feedback control loop in accordance with some embodiments of the present disclosure. At 630, processing logic may obtain a first output value for a device, the first output value corresponding to multiple parameters of the device which have associated target parameters. At 632, processing logic may calculate a measurement of each parameter of the device, each measurement being appropriate for each particular parameter. For example, a measurement may measure a period, latency, voltage, temperature, and/or another characteristic of the parameter of the device.

At 634, processing logic may calculate shift terms from the fractional difference between each parameter of the device and the associated target parameter using one-bit floating-point arithmetic, one-bit floating-point converters, and simple adders and subtractors. The fractional difference between a parameter of the device and the associated target parameter may correspond to an error between the parameter and the associated target parameter.

At 636, processing logic may calculate adjustment values by multiplying the first output value based on each of the shift terms using one-bit floating-point arithmetic and programmable binary shifters. At 638, processing logic may obtain a second output value for the device by summing the first output value and each adjustment value using a summing adder, the second output value corresponding to second measurements of each parameter of the device, such that the error between each second measurement and the associated target parameter asymptotically approach a minimal error.

Figure 7:
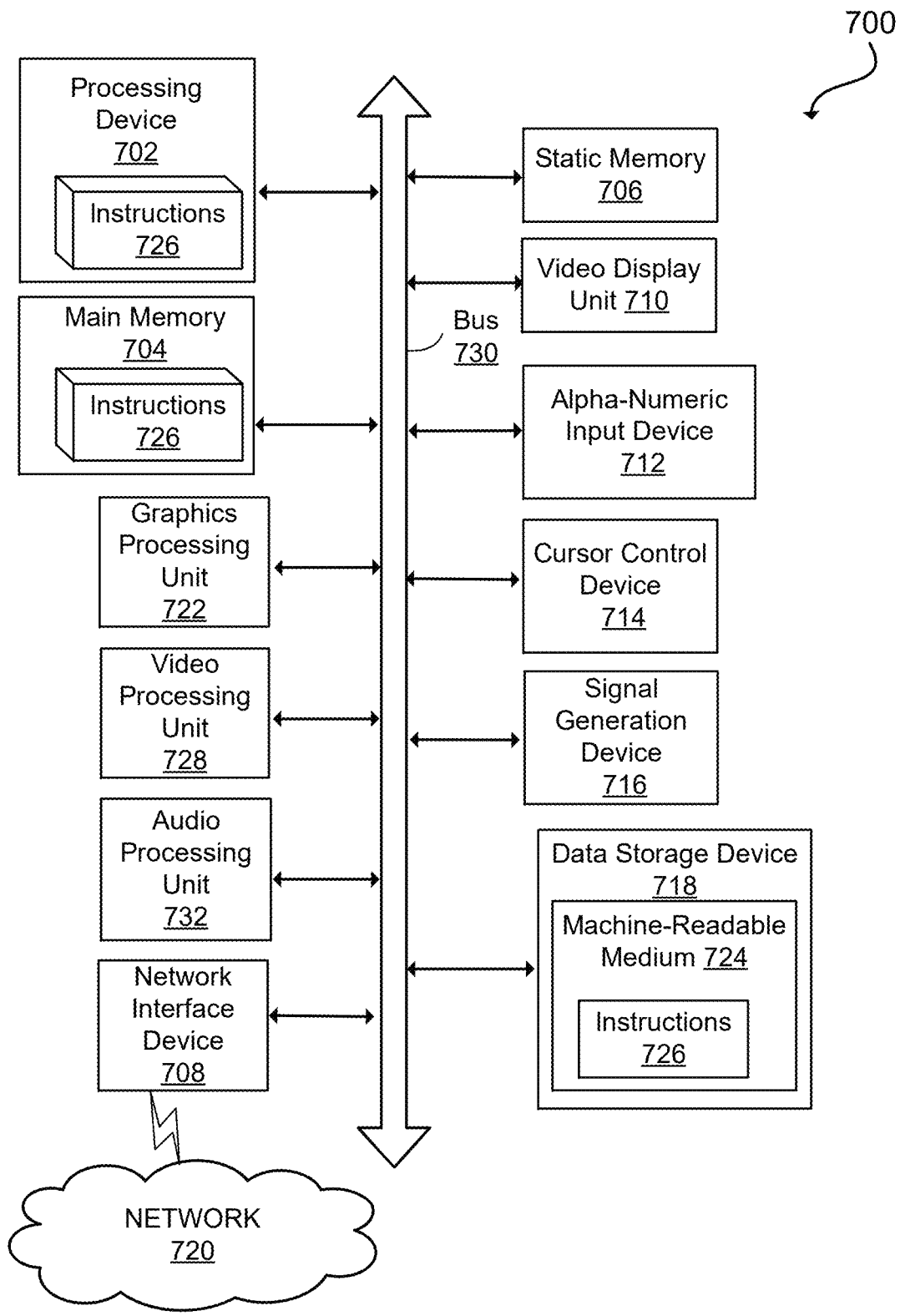
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:
   a receiver configured to receive first data of a first data format at an input frequency;
   a transmitter configured to transmit second data of a second data format at a transmission frequency; and
   a format converter, coupled between the receiver and the transmitter, to convert the first data to the second data, wherein the format converter includes:
   a phase-locked loop (PLL) that provides an output frequency based on a first frequency multiplier value; and
   a control loop coupled to the PLL, wherein the control loop converts, using at least one of one-bit floating-point converters, the output frequency of the PLL to the transmission frequency,
   wherein the transmission frequency is based on a second frequency multiplier value of the control loop, and
   wherein the at least one of the one-bit floating-point converters generates a one-bit floating-point number from an integer value of the first data to convert the first frequency multiplier value into the second frequency multiplier value.

2. The system of claim 1, wherein the format converter further includes:
a first-in-first-out queue (FIFO);
a counter that is cleared when a first synchronism control of the first data is added to the FIFO, the counter incrementing at the output frequency of the PLL until a second synchronism control of the first data is added to the FIFO;
a first measurement register of a plurality of registers storing a first value of the counter when the second synchronism control is added to the FIFO; and
a first target register of the plurality of registers storing a first target value associated with the stored first value of the counter.

3. The system of claim 2, wherein the format converter further includes:
the counter that is cleared when a third synchronism control of the first data is added to the FIFO, the counter incrementing at the output frequency of the PLL until the third synchronism control is removed from the FIFO;
a second measurement register of the plurality of registers storing a second value of the counter when the third synchronism control is removed from the FIFO; and
a second target register of the plurality of registers storing a second target value associated with the stored second value of the counter.

4. The system of claim 1, wherein the control loop includes:
a one-bit floating-point divider configured to subtract an exponent of a first one-bit floating-point operand of a first one-bit floating-point converter of the one-bit floating-point converters based on the first data from an exponent of a second one-bit floating-point operand of a second one-bit floating-point converter of the one-bit floating-point converters based on a target associated with the first data, wherein the first one-bit floating-point operand and the second one-bit floating-point operand are produced by the first one-bit floating-point converter and the second one-bit floating-point converter of the control loop.

5. The system of claim 4, wherein the control loop further includes:
a one-bit floating-point multiplier driven by a sign and an exponent of a one-bit floating-point multiplicand produced by the one-bit floating-point divider that causes a binary number provided to the one-bit floating-point multiplier to be shifted according to the sign of the one-bit floating-point multiplicand and the exponent of the one-bit floating-point multiplicand.

6. The system of claim 5, wherein the first one-bit floating-point converter, the second one-bit floating-point converter, the one-bit floating-point divider, and the one-bit floating-point multiplier operate concurrently to control the second frequency multiplier value and the transmission frequency.

7. A device comprising:
a period term calculation circuit, wherein the period term calculation circuit includes:
a first one-bit floating-point converter configured to receive a first error value;
a second one-bit floating-point converter configured to receive a target value;
a first one-bit floating-point divider coupled to the first one-bit floating-point converter and the second one-bit floating-point converter; and
a first one-bit floating-point multiplier configured to receive an input value and an output value of the first one-bit floating-point divider; and
an adder-subtractor coupled to the first one-bit floating-point multiplier and configured to receive the input value, a first error sign value, and an output value of the first one-bit floating-point multiplier;
to generate a first output value.

8. The device of claim 7, further comprising:
a latency term calculation circuit, wherein the latency term calculation circuit includes:
a third one-bit floating-point converter configured to receive a second error value;
a fourth one-bit floating-point converter configured to receive the target value;
a second one-bit floating-point divider coupled to the third one-bit floating-point converter and the fourth one-bit floating-point converter; and
a second one-bit floating-point multiplier configured to receive the input value and an output value of the second one-bit floating-point divider; and
the adder-subtractor coupled to the second one-bit floating-point multiplier and configured to receive the first output value, a second error sign value, and an output value of the second one-bit floating-point multiplier
to generate a second output value.

9. The device of claim 8, wherein each of the first one-bit floating-point converter, the second one-bit floating-point converter, the third one-bit floating-point converter, and the fourth one-bit floating-point converter is configured to generate a normalized one-bit floating-point number comprising a sign bit, one or more exponent bits, and a one-bit mantissa.

10. The device of claim 8, wherein the first error value, the target value, and the second error value are integers.

11. The device of claim 7, wherein the input value comprises an unsigned binary number.

* * * * *